United States Patent
Lakomiak et al.

(10) Patent No.: US 9,109,748 B2
(45) Date of Patent: Aug. 18, 2015

(54) MACHINE CONDITIONING MONITORING CLOSED LOOP LUBRICATION SYSTEM AND METHOD

(75) Inventors: Jason E. Lakomiak, Cleveland, OH (US); Paul A. Lowe, Delaware, OH (US); Gilles Lanthier, Brossard (CA); Mandi L. Hebebrand, Avon Lake, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1888 days.

(21) Appl. No.: 12/335,659

(22) Filed: Dec. 16, 2008

(65) Prior Publication Data

US 2010/0147627 A1 Jun. 17, 2010

(51) Int. Cl.
*F16N 29/00* (2006.01)
*F16N 29/02* (2006.01)
*F16C 33/66* (2006.01)
*G01H 1/00* (2006.01)

(52) U.S. Cl.
CPC ............ *F16N 29/02* (2013.01); *F16C 33/6674* (2013.01); *G01H 1/003* (2013.01); *F16N 2210/14* (2013.01); *F16N 2250/38* (2013.01)

(58) Field of Classification Search
USPC ................. 184/7.4, 6.4, 6.24, 105.1
See application file for complete search history.

(56) References Cited

U.S. PATENT DOCUMENTS

| | | | |
|---|---|---|---|
| 4,520,902 A * | 6/1985 | Snow ............................. | 184/7.4 |
| 4,738,336 A * | 4/1988 | Smith et al. .................... | 184/6.4 |
| 5,080,195 A | 1/1992 | Mizumoto et al. | |
| 5,285,457 A | 2/1994 | Funakubo et al. | |
| 5,544,073 A | 8/1996 | Piety et al. | |
| 5,878,842 A | 3/1999 | Rake | |
| 5,971,107 A * | 10/1999 | Stitz et al. ..................... | 184/7.4 |
| 6,105,724 A | 8/2000 | Stitz et al. | |
| 6,124,692 A | 9/2000 | Canada et al. | |
| 6,447,573 B1 | 9/2002 | Rake | |
| 7,628,293 B2 * | 12/2009 | Urata et al. .................... | 222/58 |
| 2003/0047386 A1 * | 3/2003 | Sherrington .................. | 184/7.4 |
| 2009/0299535 A1 * | 12/2009 | Delaloye ...................... | 700/282 |

FOREIGN PATENT DOCUMENTS

JP    55052927 A    4/1980

OTHER PUBLICATIONS

EP 09179469.3 Extended Search Report dated Mar. 31, 2010.

* cited by examiner

*Primary Examiner* — William E Dondero
*Assistant Examiner* — Robert T Reese
(74) *Attorney, Agent, or Firm* — Fletcher Yoder, P.C.

(57) ABSTRACT

In one embodiment, the disclosed method for lubricating a machine bearing system includes monitoring a bearing system using a vibration sensor, such as an accelerometer, receiving a signal from the vibration sensor, calculating a parameter based on the signal; and adding a lubricant to the bearing system based upon the parameter. In another embodiment, a system may include a vibration sensor, a monitor configured to receive a signal from the vibration sensor and calculate a spike energy value, and a lubrication device configured to add a lubricant to a bearing system based on the spike energy value. The system and method help reduce maintenance and repair costs, while prolonging the life of the machine system components being monitored.

22 Claims, 4 Drawing Sheets

MACHINE CONDITIONING MONITORING CLOSED LOOP LUBRICATION SYSTEM AND METHOD

BACKGROUND

The invention relates generally to systems for monitoring of mechanical machine systems. More particularly, the invention relates to systems and methods for configuring, processing, and presenting machine condition monitoring information.

Various systems and components may be used to monitor and protect industrial equipment and machines. Depending upon the type of mechanical system, the monitoring and protection components may generate various signals representative of dynamic conditions. The signal-generating components may be sensors and transducers positioned on points of interest of the machine systems. The signals are applied to monitoring circuits that are somewhat remote from the points of interest, and are used to analyze the performance of the machine system. Machine systems thus instrumented may include rotary machines, fans/blowers, pumps, assembly lines, production equipment, material handling equipment, power generation equipment, as well as many other types of machines of varying complexity.

The rotating components of machine system require lubrication, which is important to optimize efficiency and performance of the system. To ensure reliable operation and prevent downtime, the system lubricant may be changed on a periodic basis. For example, bearing lubricant in a machine system may be changed every 30 days. These time dependent lubricant change intervals may not reflect the actual usage of a machine system lubricant and can result in lubricant change that does not match actual lubricant wear and tear. Specifically, an infrequently-used machine system may not require a lubricant change as frequently as a high usage machine system. Therefore, in some instances, a lubricant change cycle that is time dependent may not change the system lubricant at the correct point of the lubricant life.

BRIEF DESCRIPTION

In one embodiment, the disclosed method for lubricating a machine bearing system includes monitoring a bearing system using a vibration sensor, such as an accelerometer, receiving a signal from the vibration sensor, calculating a parameter based on the signal; and adding a lubricant to the bearing system based upon the parameter. The parameter to be calculated may be high frequency enveloping bands, which characterizes vibration for machine system components. In one embodiment, the parameter is a spike energy calculation that may indicate whether a machine system needs lubrication. In another embodiment, a system may include a vibration sensor, a monitor configured to receive a signal from the vibration sensor and calculate a spike energy value, and a lubrication device configured to add a lubricant to a bearing system based on the spike energy value. The system and method help reduce maintenance and repair costs, while prolonging the life of the machine system components being monitored.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
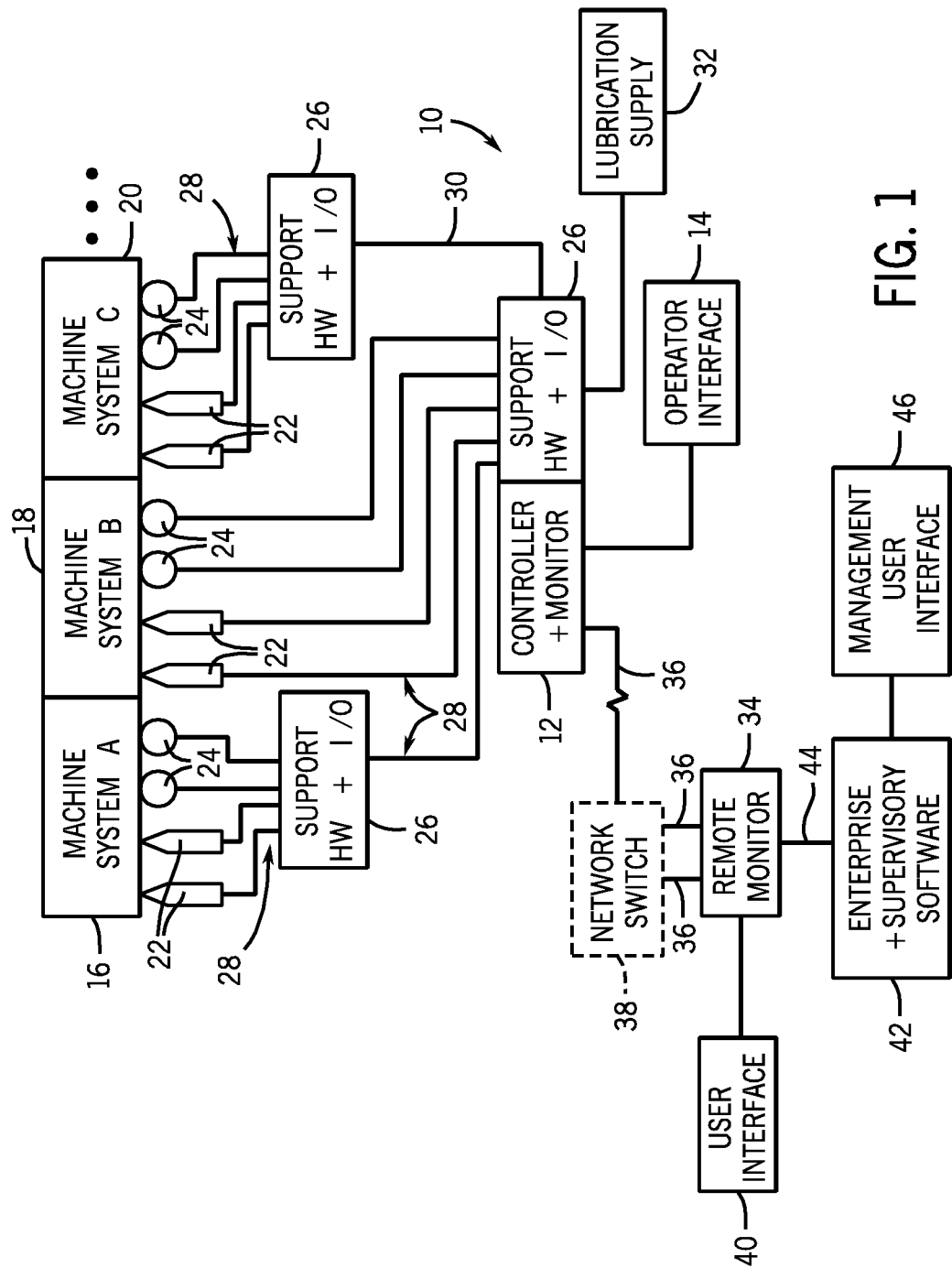
FIG. 1 is a block diagram of a machine condition monitoring and control system in accordance with an embodiment of the present technique.

Turning now to the drawings, and referring first to FIG. 1, a diagrammatical overview of an embodiment of a machine condition monitoring and control system 10 is illustrated. The machine condition monitoring and control system 10 is particularly well suited for monitoring, detecting, and controlling a wide range of dynamic operating parameters of mechanical machine systems. In particular, the system is well suited to various types of rotary equipment, although other applications may be envisaged for certain aspects of the present technique. As referred herein, the term "dynamic operating condition" or the reference to condition monitoring is intended to convey physical conditions or parameters of a mechanical machine system, as opposed, for example, the electrical conditions. The dynamic conditions may include such characteristics as vibration, rotation, speed, temperature, pressure, and so forth.

The condition monitoring and control system 10 is designed to allow monitoring and control of multiple machine systems, processes, conditions, and/or parameters at various points along one or more machine systems. A system controller 12 is connected to various components of a machine system coupled to condition monitoring and control system 10, and is configured to enable an operator to view the status of the system via operator interface 14. The term controller may be any suitable system configured to manage and/or monitor a machine system process, such as the operation of a conveyor or a pump. Further, the controller may include an industrial computer, processor, memory, and/or appropriate software to communicate with actuators, sensors, and other inputs/outputs. For example, the controller and monitor 12 may be an industrial computer or a programmable logic controller. Operator interface 14 may allow a user to configure condition monitoring and control system 10, thereby enabling the system to monitor various machine condition parameters, including vibration data. For example, in a presently contemplated embodiment, a user may configure multiple machine systems, such as machine system A (16), machine system B (18), and machine system C (20). Machine systems 16, 18, and 20 may be any conceivable type of system susceptible to such automation, and may be part of separate or linked machines. Examples of such systems include fan/blower machine systems, pump systems, motor systems, conveyor systems, to mention only a few. Further, machine systems 16, 18, and 20 may each be composed of several machine systems. For instance, machine system A may include a motor system and a fan/blower system.

As depicted, a user may configure systems 16, 18, and 20 to be controlled and monitored by condition monitoring and control system 10 using a software interface. The operator may configure the machine system by indicating the number and type of sensors 22, such as accelerometers, to monitor machine system A 16. This enables the operator to configure controller and monitor 12 to dynamically monitor the condition of one of more machine systems.

In addition, the machine system may interpret data from accelerometers 22 to determine when auto lubrication devices 24 inject a lubricant into a bearing or other mechanism of the machine system. As depicted, several accelerometers 22 and auto lubrication devices 24 may be mounted on a machine system. Further, an accelerometer 22 reading at a bearing location may correlate to the action of an auto lubrication device 24. For example, if a vibration parameter from a sensor reading exceeds a certain value, the auto lubrication device located near the sensor will add lubrication to the machine system at that location. The auto lubrication device 24 may be a unit coupled to and controlled by a processing device that is also coupled to sensors 22. For instance, auto lubrication device 24 may be a single point lubricator, such as a device available from The Timken Company of Canton, Ohio, under the commercial designation G-Power or M-Power, mounted to various positions on a bearing system. The device may be controlled, using electrical, mechanical, or fluid means, by controller and monitor 12, which may contain the processor. The controller and monitor 12 may also be electrically coupled to sensors 22 to interpret measurements, thereby determining when devices 24 apply a lubricant. In another embodiment, one controller and monitor 12 may be coupled to several machine systems via a switch, or other multiplexing device that routes the signals between the system components. In an embodiment, each machine system 16, 18, and 20 may be coupled to a controller and monitor 12. Further, any number of machine systems (or subsystems) may be included in a single condition monitoring and control system 10.

Machine systems 16, 18, and 20 may each have multiple sensors 22 and auto lube devices 24 positioned at various locations in each machine system. Sensors 22 may include sensors, such as accelerometers, thermocouples, and pressure sensors, for both condition monitoring and for an auto lubrication process for the machine system. For example, vibration sensors 22 located in a blower/fan embodiment of machine system A 16 may be placed on various bearings that support a rotating shaft of the fan system. In other words, sensors 22, in the form of accelerometers, may monitor vibrational data at various points along the rotational shaft of a fan in machine system A 16. Further, auto lubrication devices 24 may be used to lubricate various points on machine systems 16, 18, and 20, thereby ensuring that these machine systems are operating properly and efficiently. For instance, auto lubrication devices 24 and sensors 22 may be coupled to bearing locations within a machine system. Specifically, a lubricant, such as oil, is necessary for smooth and efficient operation of many rotational machine systems, such as for bearings in a fan and motor system. The bearing locations in a machine system may be monitored using a vibration parameter to assess the state of the lubrication within a bearing.

Vibration in a bearing may be monitored by measuring a parameter, such as high frequency enveloping bands, which may include a calculation of spike energy. The spike energy calculation may be measured and analyzed as discussed in U.S. Pat. No. 6,868,348, which is herein incorporated by reference in its entirety for all purposes. In other embodiments, the high frequency enveloping bands parameter may include high frequency envelope detection or high frequency detection. High frequency detection is a shortened version of high frequency envelope detection and may include non filtered readings as a domain of interest. Alternatively, the parameter may include envelope spectrum processing filter, which may detect bearing and other component defects. The envelope spectrum processing filter may apply a band pass filter, envelope the time domain signal, and then perform a frequency analysis on the result. Sensors 22 and auto lubrication devices 24 may be connected to support hardware 26 via network, electrical, or other suitable leads 28. In an embodiment, support hardware 26 may be measurement hardware capable of translating the measurement signal to information readable by controller and monitor 12. For example, support hardware 26 may contain analog to digital converters, hardware filters, and other signal conditioning devices. Further, support hardware 26 may contain input or output devices that communicate control commands to actuators 24.

Condition monitoring and control system 10 may monitor a wide range of dynamic operating conditions on a continuous basis for machine information, protection, monitoring, and control purposes. Accordingly, the condition monitoring and control system 10 may include a series of sensors, detectors, transducers, or actuators mounted on various points of the machine system to detect the desired dynamic operating conditions. As depicted, support hardware modules 26 may be remotely connected via connection 26 and may use any appropriate data communications protocol, such as a DeviceNet or Ethernet, thereby providing remote control of support hardware 26. A single controller and monitor 12 may be coupled to a plurality of machine systems, or may be coupled to a single machine system to optimize performance. Further, support hardware modules 26 may be integrated into controller and monitor 12, utilizing commercial communication techniques, such as serial ports or USB connections. Communications may also be performed wirelessly, or some of the communications may be via conventional wired connections, while others are wireless. A lubricant, such as oil or grease, may be stored in each auto lubrication device 24 or may be supplied by a central lubrication supply 32 for the entire condition monitoring and control system. As will be discussed in detail below, condition monitoring and control system 10 enables improved lubrication of machine systems by using a closed loop control system. Condition monitoring and control system 10 also enables a user to perform complex calculations to condition monitoring and vibration data and information via software on controller and monitor 12. For example, a user may select to perform a fast Fourier transform calculation and a spike energy calculation on vibration data of a fan/blower machine system. The results of selected software calculation for each machine system type may then be used alone or in conjunction with other data, such as temperature or pressure, to assess and diagnose the lubrication status for bearing systems in each machine system.

A monitor 34 may be used to remotely perform system configuration tasks and present the condition monitoring data to a system operator. For instance, a remote monitor 34, including a computer, may be linked via Ethernet connections 36 to controller and monitor system 12, thereby enabling a monitor 12 and attached computer to organize, configure, and present the condition monitoring data alongside the controls and configuration for a control system. A network switch 38 may be placed within network connections 36, thereby routing the condition monitoring and control information across a potentially larger distance. For example, monitor 34, computer and user interface 40 may be located at a manager's desk away from the factory floor where controller and monitor 12 may be located. In some embodiments, the networking hardware 36 and 38 may utilize Ethernet, 802.11, Bluetooth, controller-area network, or other suitable communication techniques and apparatus. In addition, condition monitoring and control system 10 may include enterprise and supervisory software 42 that may be linked via network connection 44 to the controller and monitors 12 and 32. Enterprise and supervisory software 42 may harvest data from a database containing condition monitoring and control information, to present a machine condition and control system status to a manager via a management user interface 46. Operator interface 14, user interface 40, and management user interface 46 may include any number of suitable display devices, such as a liquid crystal display (LCD) monitor, a personal data assistant (PDA), or a telephone. Management user interface 46 may display information such as a vibration profile and/or vibrational trend data over a time period plotted against alarm values and baseline values for the vibration data. Further, management user interface 46 may present statistical process control information or other historical data in a manner that enables a manager to view the status of one or more machine systems.

The various sensors 22 of the condition monitoring and control system 10 may produce a wide range of signals and information based upon the detected dynamic machine operating conditions. Each sensor 22 may generate one or more signals which are communicated to controller and monitor 12. The various sensors 22 and/or transducers may be active or passive, and may receive power for operation via connection lines 28. For example, the sensors 22 of an instrumented turbine machine system B 18 may detect dynamic machine operating conditions such as valve position and case extension, bearing absolute casing vibration, both in X and Y directions, differential expansion, speed of rotation, rotational phase, and so forth. Various sensors and transducers may be employed for these measurements, including Lanier variable differential transformers, non-contact pickups, rotary potentiometers, accelerometers, and so forth. In an embodiment, the particular configuration of controller and monitor 12 may be connected to a specially adapted vibration monitor located in support hardware 26, designed to be coupled a tachometer and accelerometer. In addition, hardware and software within condition monitoring and control system 10 may process the input signals to produce vibrational data and parameters which may be used to analyze the performance and/or operating conditions of the mechanical machine system. Certain of the machine conditions or vibration parameters may be particularly indicative of abnormal and unwanted conditions, such as wear, impending failure, unbalance, excessive loading, misalignment, looseness, and so forth.

As discussed in detail below, controller and monitor 12 may receive condition monitoring data as well as high frequency enveloping bands vibration data from one or more machine systems. Controller and monitor 12 may then analyze the data to determine a cause of a vibration within the machine system and/or bearing systems. Specifically, sensors 22 in the form of accelerometers may provide a vibration profile and data for a bearing system which may then be processed to produce a spike energy calculation for a particular bearing system. If the spike energy value for a bearing system exceeds a threshold value or triggers an alarm based on other criteria, controller and monitor 12 may send a signal causing auto-lubrication devices 24 to lubricate the bearing system that produced the spike energy value.

Alternatively, controller and monitor 12, after receiving a spike energy alarm, may analyze other condition monitoring data to determine the cause of the spike energy value. In particular, the spike energy value may not always be caused by low lubrication levels in a bearing system, and the cause of a spike energy alarm may be determined by analysis of various other measurements including temperature overheating, excessive loading, unbalance, misalignment, looseness, and/or other parameters. In such a case, controller and monitor 12 may not add lubricant to the bearing system, and may instead notify a user of a fault in the machine system. Moreover, the controller and monitor 12 may assess the performance of a bearing system after lubrication by the auto-lubrication device 24, to ensure that the addition of lubrication has fixed the fault that caused an alarm. In the case where the addition of lubrication to a bearing system does not correct the spike energy reading or other vibration parameter alarm, the controller and monitor 12 may analyze condition monitoring data and/or further add lubricants to the bearing system, depending upon programming and logic for the machine system. For example, if adding a lubricant to a bearing system does not correct the fault, the controller and monitor 12 may add lubricant without analyzing other condition monitoring data to determine a cause of a system fault. In another embodiment, the system may add lubricant to a bearing system only after analyzing condition monitoring data to ensure that additional lubrication is needed. An auto-lubrication system that includes controller and monitor 12 and auto-lubrication device 24 may provide flexibility to an operator or programmer that enables various routines and/or processes to be performed to ensure that a machine system is operating efficiently. Therefore, the machine system will perform efficiently and be lubricated at appropriate intervals to extend the life of the machine system components and lower maintenance costs.

Figure 2:
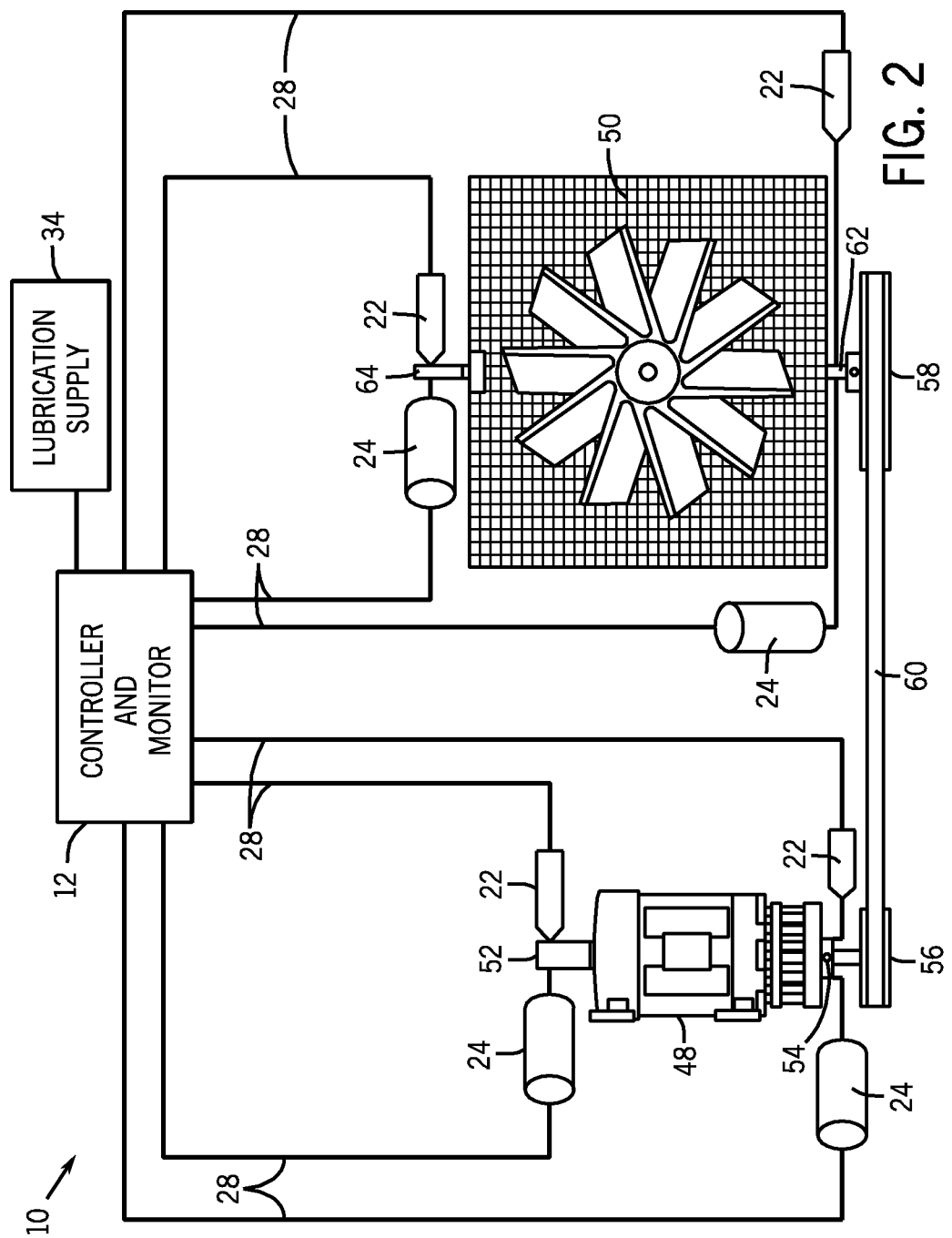
FIG. 2 is a detailed schematic diagram of certain components of the condition monitoring and control system, including auto-lubrication components, coupled to a fan system and motor system, in accordance with an embodiment of the present technique.

FIG. 2 is a schematic diagram of an embodiment of condition monitoring and control system 10. Specifically, the illustrated schematic diagram includes controller and monitor 12, sensors 22, auto-lubrication device 24, and lubrication supply 34, all coupled to machine systems 16, 18, and 20. As depicted, controller and monitor 12 may be an industrial computer, memory device, and/or a processor with instructions that enable control of an auto-lubrication process, as well as a condition monitoring process. Controller and monitor 12 may be coupled via connection lines 28 to auto-lubrication devices 24 and sensors 22. Connection lines 28 may be electrical, fluid, network, or any combination of the above, connections configured to control and communicate with auto-lubrication devices 24 and sensors 22. For example, auto-lubrication devices 24 may include valves that are controlled by an electrical signal from controller and monitor 12. Alternatively, auto-lubrication devices 24 may be controlled by a fluid connection, such as hydraulic or using a lubricant, which drives or controls components within auto-lubrication devices 24.

In addition, sensors 22 may be electrically connected 28 to controller and monitor 12, thereby transmitting signals that represent vibrational data from accelerometers and/or other sensors. As illustrated, auto-lubrication devices 24 and sensors 22 may be coupled to various locations of a motor system 48. Further, the auto-lubrication devices 24 and sensors 22 may also be placed in various locations on a fan system 50, as part of condition monitoring and control system 10. As depicted, auto-lubrication devices 24 and sensors 22 may be located at different points of a single bearing system or on a plurality of bearing systems that may be located throughout a machine system. As illustrated in the schematic, auto-lubrication devices 24 and sensors 22 are located at each end of motor system 48, such as at rear-bearing location 52 and front-bearing location 54. A plurality of auto-lubrication devices 24 may be configured to lubricate a particular location within a machine system, and a plurality of sensors may be used to monitor each bearing location. In addition, motor system 48 may be coupled via a pulley 56, pulley 58, and belt 60 to mechanically couple motor system 48 to fan system 50. Front-bearing location 62 includes a coupling to an accelerometer sensor 22 and an auto-lubrication device 24. For example, a spike energy reading, based on a calculation from a vibration parameter, may be compared to and exceed an alarm value or threshold. As a result, auto-lubrication device 24 may be instructed by controller and monitor 12 to add lubricant at front-bearing location 62 of fan system 50. Moreover, controller and monitor 12 may have instructions and/or logic to analyze the state of a machine system, thereby enabling controller and monitor 12 to determine if the spike energy alarm value has been caused by low lubrication levels or by other factors, such as wear, unbalance, or looseness, as determined by machine conditioning monitoring data. In an embodiment, accelerometer 22 and auto-lubrication device 24 may be coupled to the ear-bearing location 64 of the bearing system.

In an embodiment, auto-lubrication devices 24 may be self-contained units that include a supply of lubrication for each bearing system position, thereby enabling the oil to be refilled locally, without transmission of a lubricant via supply hoses. Accordingly, by using a local reservoir in the auto-lubrication device 24, the monitoring and control system 10 may avoid a buildup of sludge within a network of lubrication lines, thereby reducing maintenance. Alternatively, a central lubrication supply 34 may be a central reservoir, including a network of hoses, configured to supply a plurality of auto-lubrication devices 24 in a condition monitoring and control system 10. Further, in an embodiment, auto-lubrication devices 24 may include a processor or other logic devices coupled to and configured to process signals from accelerometer sensors 22, thereby enabling the lubrication feedback loop to be entirely local to each location on a machine system. For instance, a programmable logic controller (PLC) may be incorporated into an auto-lubrication device and may be programmable to increment an oil lubrication of a bearing system based on a connection to an accelerometer sensor. In addition, the auto-lubrication device 24 may include processing capabilities in order to interpret data from sensors 22, thereby enabling a calculation of spike energy or other vibration parameters in order to determine a status of a bearing system.

As will be appreciated those skilled in the art, condition monitoring and control system 10 includes components that enable an automatic closed loop lubrication cycle for machine systems, including bearing systems that require lubrication to operate efficiently. The disclosed auto-lubrication components enable the condition monitoring and control system 10 to add a lubricant as needed, based on a vibration parameter that indicates a machine system component, such as a bearing, is need of lubrication. This system improves efficiency and reduces wasteful lubrication, which may occur with a manual lubrication cycle that adds lubricant based on time intervals. For instance, in a manual lubrication cycle, a bearing system may be lubricated once every fifty hours of operation, without regard to actual wear and tear of components within a machine system. In such a time-based system, in a machine system that experiences heavy usage, an under lubricated bearing system may experience high vibration and wear out machine system components due to a lack of while reducing efficiency and performance, thereby increasing costs and requiring repair of a machine system due to lack of lubrication. Alternatively, a time-based system may add unnecessary lubricant in a situation where a machine system is not experiencing heavy usage, thereby adding unnecessary maintenance costs. Thus, a condition monitoring and control system 10 that includes automatic lubrication components reduces the costs of maintenance associated with a time-based manual lubrication cycle and further does not require an operator to manually lubricate the machines. Accordingly, the depicted auto-lubrication components of the condition monitoring and control system 10 reduces overall wear and tear in a machine system, reduces costs, and oversight by an operator on a factory floor.

Figure 3:
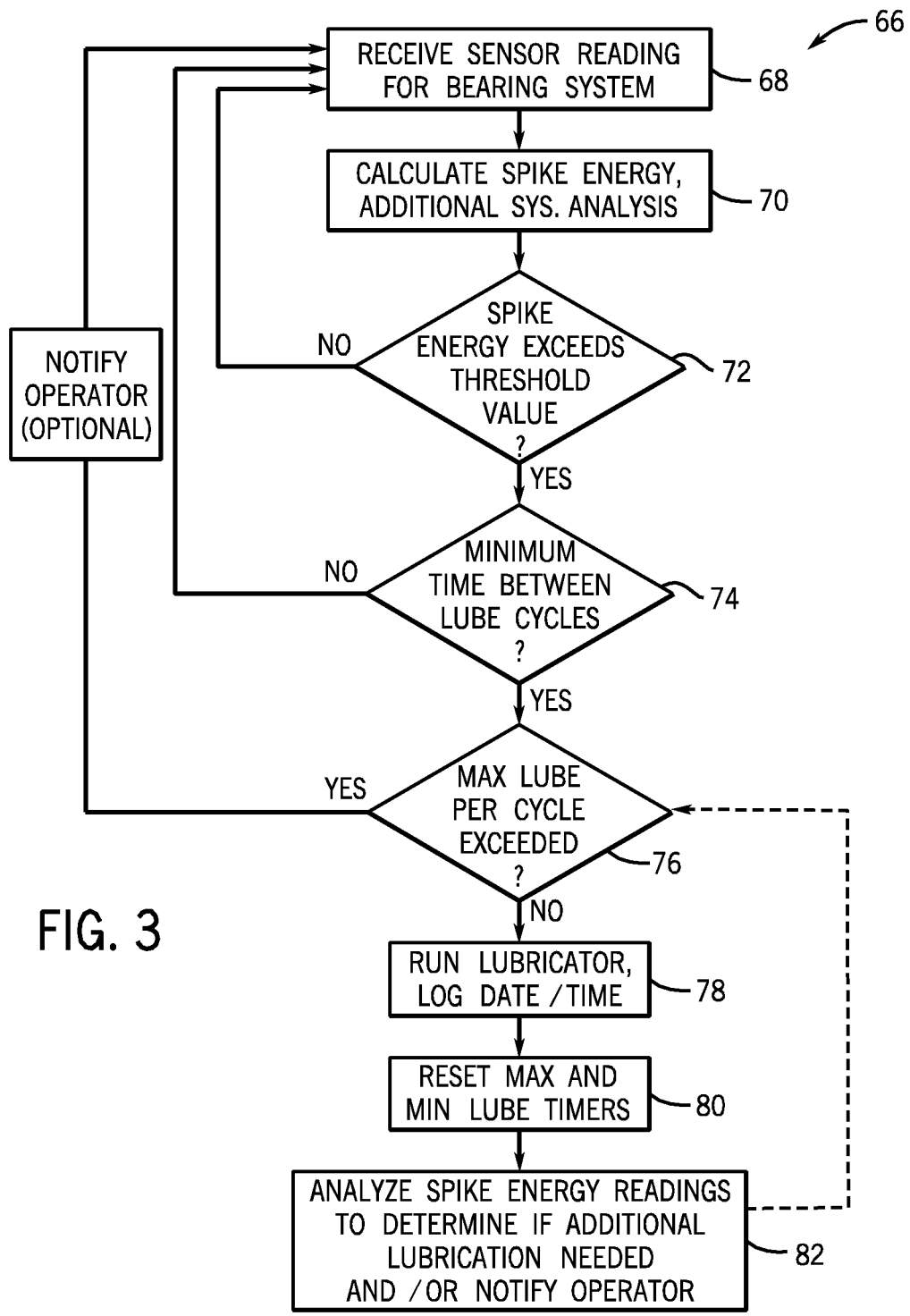
FIG. 3 is a flow chart of an auto-lubrication cycle performed by the condition monitoring and control system, in accordance with an embodiment of the present technique.

FIG. 3 is a flow chart 66 illustrating an automatic lubrication process for a machine system. In the first step 68, a sensor reading for a bearing system is received by a controller and monitor 12. The sensor reading may be an accelerometer reading that may indicate a vibration parameter that correlates to level of lubrication within a bearing system. In step 70, the sensor reading may be processed by controller and monitor 12 to calculate a vibration parameter, such as spike energy, which is useful in an assessment of a bearing system's lubrication level. Moreover, a processor located in controller and monitor 12, or locally in an auto-lubrication device, may calculate spike energy and other machine condition monitoring system parameters, thereby enabling an analysis of the machine system and its bearings. In step 72, the spike energy value may be compared to a threshold value. For example, a threshold or alarm value may be set for a spike energy reading based on machine system components and other factors, such as machine system age, environment, and usage. An alarm may be configured to be activated based on a comparison of a parameter to a threshold value or based on a formula or function. Further, an alarm may be configured to be activated if threshold values is exceeded a specified number of times, thereby triggering a lubrication cycle. For instance, a controller and monitor 12 may be configured to compare a spike energy value to a threshold value, where an alarm is activated if the threshold is exceeded five times in a thirty minute span. This configuration would ensure that a false positive alarm value does not trigger a lubrication of the system that is unnecessary.

Turning back to flowchart 66, in step 68, if a spike energy threshold value is not exceeded then the system will continue to monitor and receive sensor measurements for various bearing systems of a machine system. In addition, if a spike energy value exceeds a threshold then the controller and monitor 12 may check to see if a minimum time between lube cycles has occurred, as shown in step 74. By ensuring that a minimum time between lubrication cycles has occurred, the system may check to make sure that over lubrication does not occur within a bearing system or machine system. Therefore, a lubricant may only be applied if a minimum time has been exceeded between lubrication cycles by the auto-lubrication device 24. Step 74 may not be implemented in all embodiments of condition monitoring and control system 10, depending upon application specific factors and other criteria. If the minimum time between lubrication cycles has not been met, then the system will continue to monitor sensor measurements for a machine system. In step 76, if a minimum time between lubrication cycles has elapsed, analysis of the amount of lubrication applied over a time period may occur. As discussed below, the system may check to ensure that a maximum amount of lubricant has not been exceeded during a time period, thereby ensuring that the system is not over lubricated, preventing damage to the bearing system. This situation is undesirable in a situation where vibration in a bearing is not caused by a lack of lubrication, yet the system iterates in a lubrication cycle in an attempt to correct the issue. Therefore, the system must monitor the amount of lubrication added and the time of lubrication, in order to perform step 76. Further, if a maximum amount of lubrication has been exceeded, then a notification may be sent to an operator to indicate that there may be a system fault unrelated to the lubrication of bearing systems. As such, a spike energy reading that exceeds a threshold or alarm value may be indicative of another system fault, such as unbalance, rather than a need for lubrication. In addition, the system will continue to monitor bearing systems if a maximum amount of lubrication has been applied during a time period. The time period for steps 74 and 76 may be the same time period or different time periods based on system specific criteria and other factors.

In step 78, if a maximum amount of lubrication has not been applied, then an auto-lubrication device 24 may apply lubricant to a bearing system and log the time of application. The controller and monitor 12 may log the time of lubrication to record trends and provide information for steps 72, 74 and 76, thereby ensuring that time intervals between lubrications are recorded. In step 80, the time periods and timers for minimum lubrication intervals and maximum lubrication amounts may be reset as they correspond to steps 74 and 76, respectively. In step 82, the spike energy readings may be analyzed to determine if additional lubrication is needed and to evaluate whether an operator needs to be notified of a condition or fault within a bearing system. If a spike energy reading continues to exceed a threshold value, then a lubricant may be applied again if it is determined that lubricant is the source of the spike energy alarm. A system may also be configured to perform step 76 after lubrication, to ensure that additional iterations of a lubrication cycle do not cause over-lubrication. Further, the controller and monitor 12 may analyze other condition monitoring variables to ensure that lubrication is the cause of the bearing system failure or fault, thereby providing information as to whether the lubrication may need to be reapplied or if an operator needs to be notified of a system failure or fault.

Figure 4:
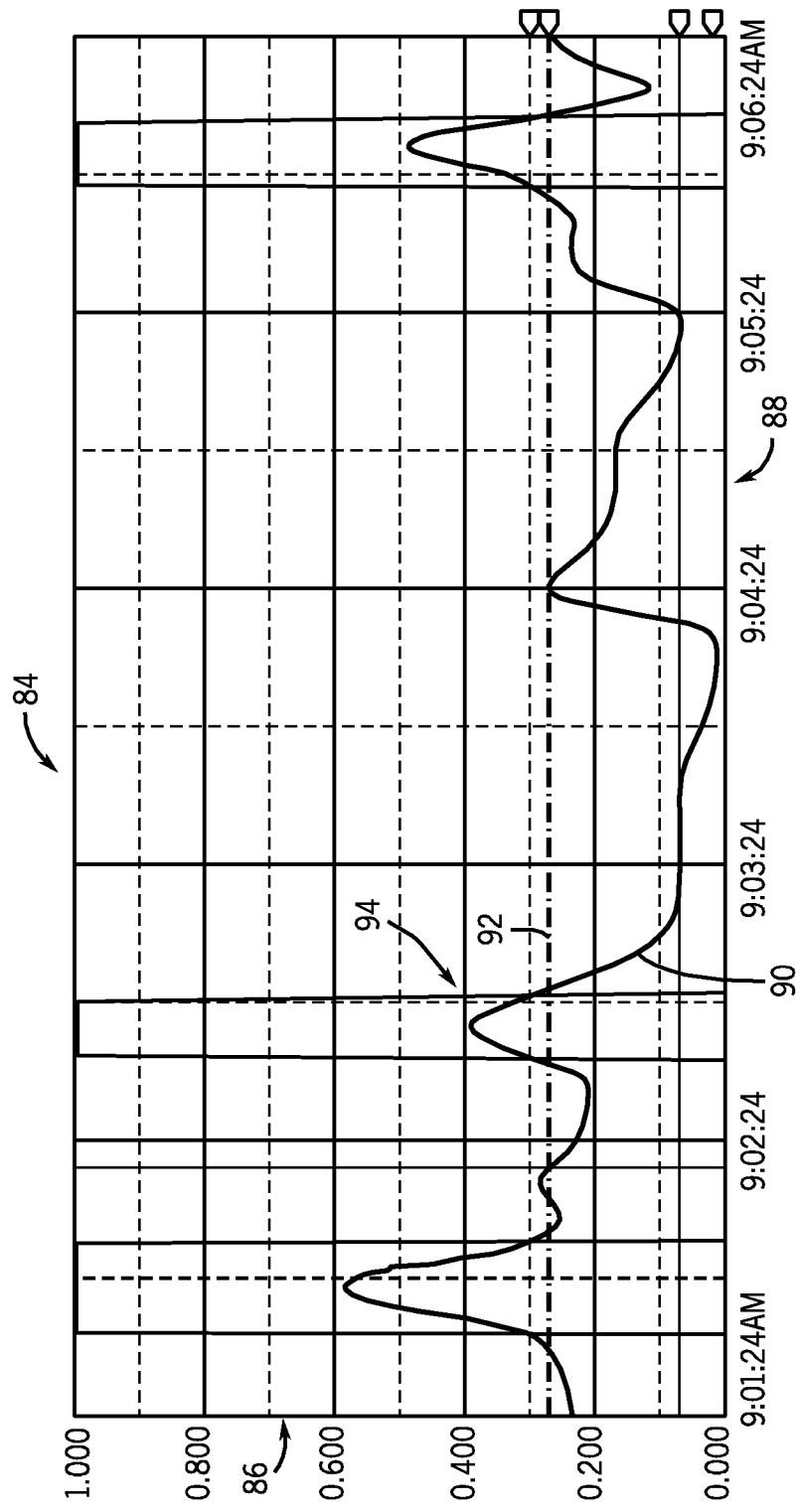
FIG. 4 is an illustration of a trend of a vibration parameter, such as spike energy, as calculated by a monitoring and control system, in accordance with another embodiment of the present technique.

FIG. 4 is a chart 84 plotting spike energy amplitude or intensity 86 versus time 88. As illustrated, spike energy data calculations may be presented in the form of a trend of a vibration parameter, such as spike energy 90, that may shown in a user interface, such as a computer monitor, and may be logged to a database or other memory device for analysis and trending. In the chart, a threshold value 92 is illustrated wherein peak values 94 exceed the threshold value 92, thereby triggering an alarm within the auto-lubrication components of condition monitoring and control system 10. As discussed, an alarm may be configured to cause lubrication if the threshold is exceeded once or a set number of times within a time period, depending on a system configuration. Further, a vibration parameter value 90 may also be compared to a function or trend over time, thereby producing an alarm if the value exceeds an allowable deviation from the function or trend.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for lubricating a machine bearing system, comprising:
monitoring a bearing system using a vibration sensor;
receiving a signal from the vibration sensor;
calculating a value of spike energy based on the signal; and
adding a lubricant to the bearing system based upon the spike energy value via an automated lubrication device.

2. The method of claim 1, further comprising evaluating the spike energy to determine whether the bearing system needs lubrication.

3. The method of claim 2, comprising evaluating the spike energy by comparing the spike energy value to a threshold value.

4. The method of claim 1, wherein the spike energy value comprises a rate of change of spike energy.

5. The method of claim 1, wherein the vibration sensor comprises an accelerometer.

6. The method of claim 1, comprising evaluating the spike energy following addition of the lubricant to determine whether an undesired condition exists in the bearing system.

7. The method of claim 6, comprising notifying an operator that the undesired condition exists in the bearing system.

8. The method of claim 1, comprising evaluating the spike energy and machine condition monitoring data to detect a cause of an undesirable condition in the bearing system.

9. The method of claim 8, wherein the machine condition monitoring data comprises an overall vibration parameter, an unbalance parameter, a looseness parameter, a Fourier transform parameter, or a misalignment parameter.

10. A method for lubricating a machine bearing system, comprising:
monitoring a bearing system using a vibration sensor;
receiving a signal from the vibration sensor;
calculating a value of spike energy based on the signal;
comparing the spike energy value to a threshold; and
adding a lubricant to the bearing system based upon the comparison via an automated lubrication device.

11. The method of claim 10, wherein the spike energy value is a rate of change of spike energy.

12. The method of claim 10, comprising evaluating the spike energy following addition of the lubricant to determine whether an undesired condition exists in the bearing system.

13. The method of claim 12, comprising notifying an operator that the undesired condition exists in the bearing system.

14. The method of claim 12, comprising adding a second amount of lubricant in response to the undesired condition.

15. The method of claim 10, comprising evaluating the spike energy and machine condition monitoring data to detect a cause of the undesirable condition in the bearing system.

16. A machine bearing lubrication system, comprising:
a vibration sensor;
a monitor configured to receive a signal from the vibration sensor and calculate a spike energy value; and
an automated lubrication device configured to add a lubricant to a bearing system based on the spike energy value.

17. The system of claim 16, wherein the spike energy value comprises a rate of change of spike energy.

18. The system of claim 16, wherein the monitor is configured to evaluate the spike energy following addition of the lubricant to determine whether an undesired condition exists in the bearing system.

19. The system of claim 18, comprising notifying an operator that the undesired condition exists in the bearing system.

20. The system of claim 18, comprising adding a second amount of lubricant in response to the undesired condition.

21. The system of claim 18, comprising evaluating the spike energy and machine condition monitoring data to detect a cause of the undesirable condition in the bearing system.

22. The system of claim 21, wherein the machine condition monitoring data comprises an overall vibration parameter, an unbalance parameter, a looseness parameter, a Fourier transform parameter, or a misalignment parameter.

* * * * *